July 19, 1949.  A. BOOTH  2,476,353
INFINITELY VARIABLE SPEED GEAR
Filed April 2, 1945   5 Sheets-Sheet 1

Inventor
Alfred Booth
per Ferdinand Broster Bosshardt
Attorney.

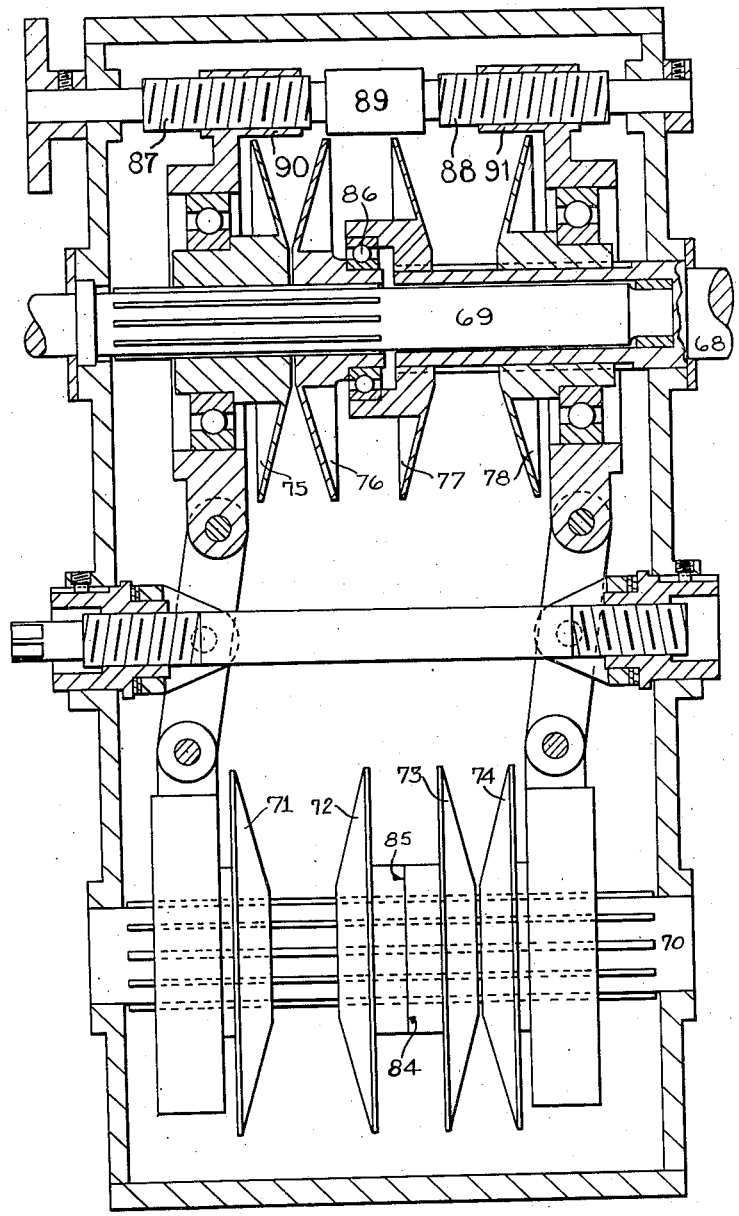

Patented July 19, 1949

2,476,353

UNITED STATES PATENT OFFICE 2,476,353

INFINITELY VARIABLE SPEED GEAR

Alfred Booth, Pendleton, Salford, England, assignor of one-half to Fred Horace Coles, Epsom, England Application April 2, 1945, Serial No. 586,211
In Great Britain April 1, 1944

5 Claims. (Cl. 74—230.17)

(Granted under the provisions of sec. 14, act of March 2, 1927; 357 O. G. 5)

This invention relates to that kind of infinitely variable speed gear wherein there are expanding V-pulleys connected together by an endless belt or belts or chain or chains and one part of one pulley is coupled to the corresponding part of another pulley so that on adjustment of the first named part axially, the second named part is simultaneously adjusted axially in the reverse direction and the position of the belt or belts or chain or chains and therefore the transmission ratio is changed.

The main object of my invention is to provide a novel form of adjusting means which can be adjusted to tension the chain or belt and is capable of automatically compensating for malalignment of the parts within predetermined limits and also automatically compensating for normal belt or chain stretch.

An infinitely variable speed gear of the hereinbefore specified kind in accordance with my invention comprises a shifting screw having a nut non-articulately connected to the first part and a lever pivotally connecting both of the said parts together and having its fulcrum displaceable and free to be automatically displaced in one direction only, the said fulcrum being furthermore adapted to be adjusted and set relative to the first part.

The said nut is non-articulately connected to a non-rotary housing containing a thrust bearing for the first part.

Where the remaining two parts of the two expanding V-pulleys are also adjustable axially, they may be similarly connected together and one of them be adjustable by means of the said shifting screw.

A second pair of expanding V-pulleys may be provided on the same shafts as the first pair to duplicate the transmission, two parts of the one pair being connected by a lever as hereinbefore described and two parts of the other pair being also connected by a lever as hereinbefore described, whilst each remaining part of the two pairs is coupled to one of the first named parts of the other pulley on the same shaft.

A second pair of V-pulleys may be provided one pair of the second pair being on the same shaft as one pulley of the first pair, and the other pulley of the second pair being rotatable independently of the other pulley of the first pair to obtain a double transmission change, two parts of each pair being connected together by a lever in the hereinbefore described manner and one remaining part of the one pulley of one pair being coupled to the remaining part of the one pulley of the other pair so as to float axially therewith but rotate independently thereof, whilst the remaining part of the other pulley of the one pair is coupled to the remaining part of the other pulley of the other pair so as to float axially and rotate therewith.

I attain the said object by the means illustrated in the accompanying drawings, wherein—

Figure 5 is a side view in section of an infinitely variable speed gear and illustrates a fifth construction.

Figure 1:
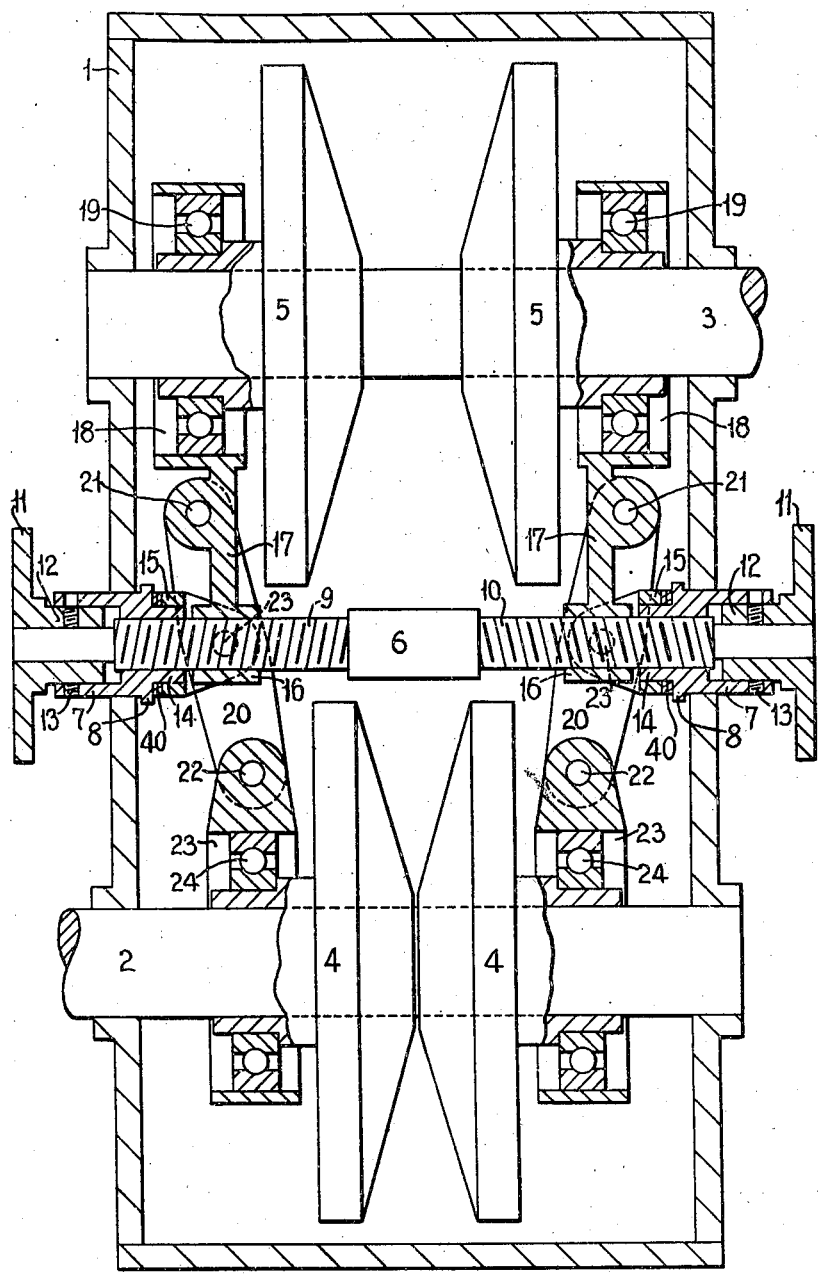
Figure 1 is a side view in section of an infinitely variable speed gear and illustrates one construction.

Referring to the drawings, in the construction shown in Figure 1, as applied by way of example to a transmission gear comprising a casing 1 in which an input shaft 2 and a parallel output shaft 3 are mounted and the input shaft 2 has slidably mounted on it the two parts 4, 4 of an expanding V-pulley, whilst the output shaft has the two parts 5, 5, of another expanding V-pulley slidably mounted on it and an endless driving chain or belt (not shown) runs on the two pulleys, there is provided between the said pulleys, a shift spindle 6 parallel with the shafts.

The shift spindle 6 is mounted in two bushes 7, 7 which are slidable in mounting holes in the sides of the casing 1 and have flanges 8, 8 which restrict their axial movement to a predetermined amount. The bushes 7, 7 have screw-threaded, axial apertures of different hand, and correspondingly screw-threaded portions 9 and 10 respectively of the shift spindle 6 engage the said apertures. Shift wheels 11, 11 are provided outside the casing 1 and have bosses 12, 12 whereby they are mounted on the ends of the shift spindle 6 to rotate the shift spindle 6. Each boss 12 engages an axial, non-screw-threaded aperture in one of the bushes 7 and is rotatable therein, but can be secured in any angular position relative thereto by a set screw 13.

Inside the casing 1 each bush 7 has a reduced cylindrical end 14, on which a forked bracket 15 is slidable, movement being limited in one direction by the flange 8 on the bush 7. A coiled compression spring 40 is provided on the bush 7 to act on the said bracket 15 in the direction in which axial movement of the bracket 15 is not limited by the flange 8. Between the prongs of each bracket 15 there is a nut 16 mounted on the corresponding screw-thread portion 9 or 10 of the shift spindle 6. The nut 16 is integral with an arm 17 which is integral with the housing 18 of a thrust bearing 19 provided between the housing 18 and the corresponding part 5 of the pulley on the output shaft 3, so that axial movement of the housing 18 causes a corresponding movement of the pulley part 5 whilst leaving it free to rotate.

Each prong of the bracket 15 has a lever 20 pivotally fulcrumed on it. One end of each lever 20 is connected to a pivot 21 provided on the corresponding housing 18. The other end of each lever 20 is connected to a pivot 22 provided on the axially slidable housing 23 of a thrust bearing 24 provided between the housing 23 and the corresponding part 4 of the pulley on the input shaft 2. By these means, both parts 5 of the pulley on the output shaft 3 are connected positively to the shift spindle 6, whilst both parts 4 of the pulley on the input shaft 2 are connected by levers 20 to the corresponding parts 5 of the pulley on the output shaft 3, the fulcrum pivots 25 of the levers being on the brackets 15.

In operation, to change the transmission ratio, the shift wheel 11 is rotated and consequently the screw-threaded parts 9 and 10 of the shift spindle 6 displace the nuts 16 axially and thereby directly cause the pulley parts 5 on the output shaft 3, for example to approach each other axially. These parts by their action through the levers 20 cause the parts 4 of the pulley on the input shaft 2 to recede from each other. The belt or chain is thus caused to shift its position, for example away from the axis on the pulley on the output shaft 3 and towards the axis on the pulley on the input shaft 2. To initially tension the belt or chain, the set screws 13 securing the bushes 7 to the bosses 12 are slackened off and the bushes 7 are rotated in the requisite direction on the spindle to cause them to be screwed along the screw-threaded parts 9 and 10 of the spindle and thereby change the position of the brackets 15 and therefore the fulcrum pivots 23 relative to the pivots 21 on the arms 17, thereby causing the levers 20 to make the pulley parts 4 on the input shaft 2 approach each other, without changing the distance between the pulley parts 5 on the output shaft 3. The pulleys are free to align themselves within limits without disturbing the relative position of the one pulley part 5 to the other pulley part 5 and the relative position of the one pulley part 4 relative to the other pulley part 4, because the bushes 7 and therefore the spindle 6 are free to move axially within limits. When normal stretch of the belt or chain develops, it is automatically taken up by the action of the charged compression springs because the said springs act to displace the brackets 15 on the lugs and thereby displace the fulcrum pivots 23 in a direction which causes the levers 20 to make the pulley parts 4 on the input shaft 2 approach each other whilst the distance between the pulley parts 5 on the output shaft 3 remains unchanged.

Figure 2:
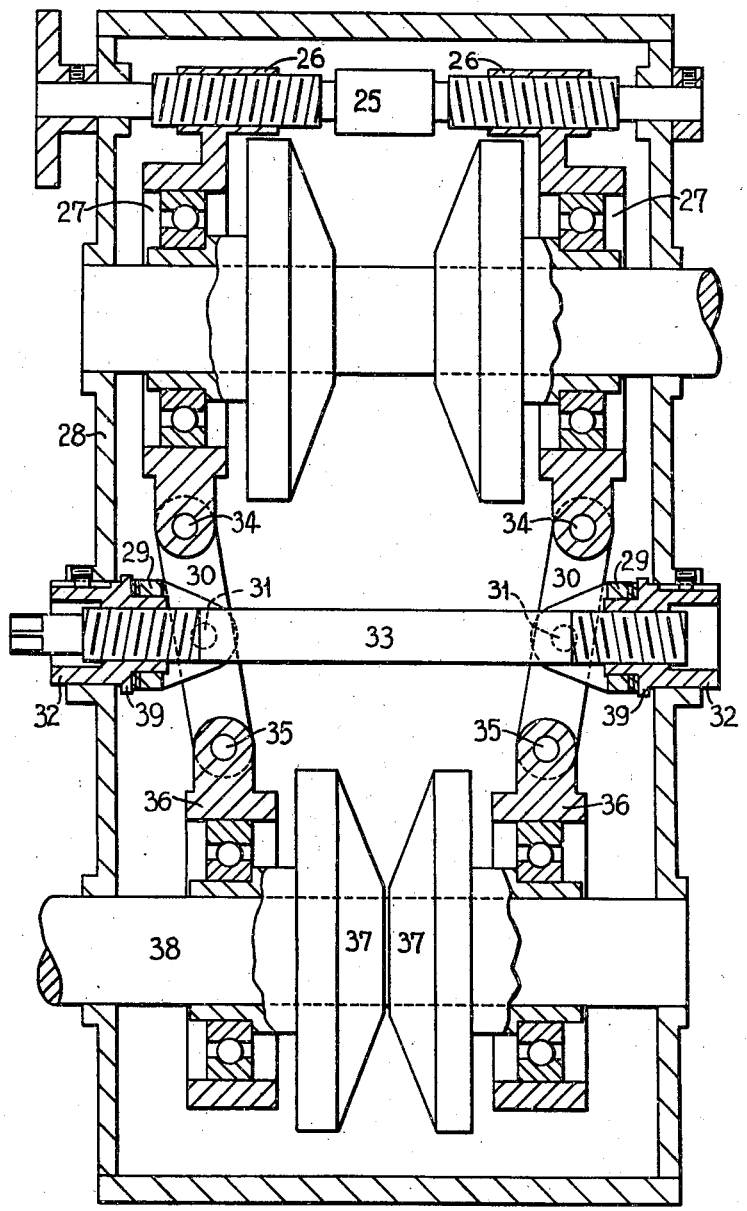
Figure 2 is a side view in section of an infinitely variable speed gear and illustrates another construction.

In the construction shown in Figure 2, the shift spindle 25 is connected by nuts 26, 26 to the respective housings 27 and is mounted in the gear casing 28 so that it is axially non-slidable. The brackets 29, 29 are provided as previously described between the pulleys and have levers 30, 30 mounted on them by fulcrum pivots 31, 31. Each bracket 29 is rotatably mounted on the reduced, cylindrical, non-screw-threaded end of a separate screw-plug 32 so as to be also axially slidable thereon. The screw plugs 32 are of opposite hand and are mounted on a suitably screw-threaded spindle 33 and slide in holes in the casing 28 whereby they can be screwed in by rotation of the spindle 33 to change the positions of the fulcrum pivots 31 relative to the pivots 34, 34 on the housings 27 non-articulately connected to the nuts 26. The levers 30 are connected by pivot pins 35, 35 to the housings 36, 36 in which the thrust bearings provided on the pulley parts 37, 37 of the input shaft 38. Charged compression springs may be situated between the brackets 29 and the flanges 39, 39, on the screw plugs 32, 32. The levers 30, 30 operate in the same manner as that described with reference to the levers 20 of the first described construction.

Figure 3:
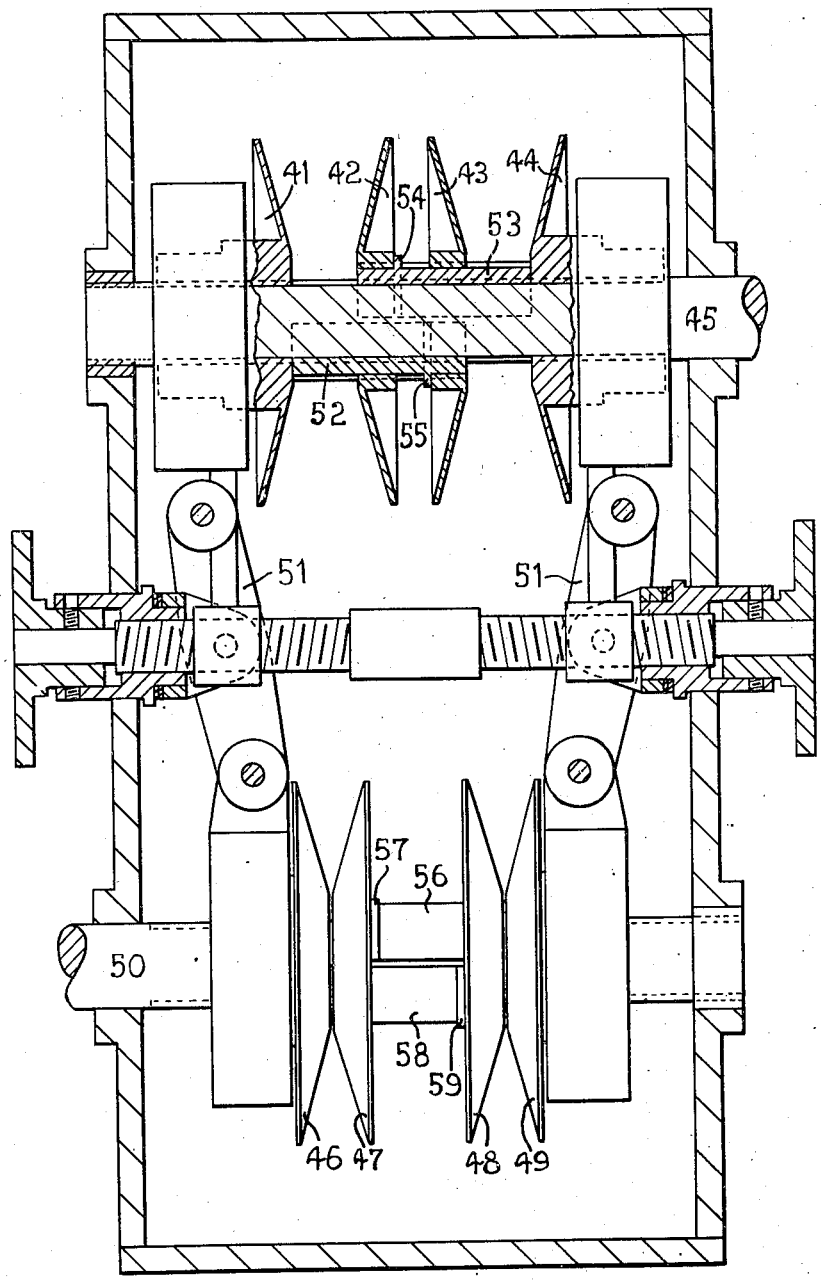
Figure 3 is a side view in section of an infinitely variable speed gear and illustrates a third construction.

In order to enable an increased load to be transmitted there may be, for example as shown in Figure 3, two adjustable V-pulleys provided on the output shaft and two adjustable V-pulleys provided on the input shaft and two belts or chains running on them. This results in there being a row of four pulley parts 41, 42, 43 and 44 respectively on the output shaft 45 and four pulley parts 46, 47, 48 and 49 respectively on the input shaft 50. The pulley part 41 and the pulley part 44 of the one row are connected by levers 51 to the pulley part 46 and pulley part 49 respectively of the second row, and are shifted and adjustable in the manner hereinbefore described with reference to Figure 1. In one row the pulley part 42 is slidably mounted on the one half 52 of an axially divided sleeve and the pulley part 43 is slidably mounted on the remaining half 53 of the said sleeve the two halves of which are splined internally to the shaft 45 and are splined externally to pulley parts 42 and 43. The half 53 of the sleeve projects beyond the end of the half 52 and abuts against the inner face of the pulley part 44. The half 53 has a flange 54 which acts on the outer face of the pulley part 42. The half 52 of the sleeve projects beyond the end of the half 53 and abuts against the inner face of the pulley half 41 and has a flange 55 which acts on the outer face of the pulley half 43. Therefore any inward movement of the pulley half 41 caused by the shifting or adjusting operation is transmitted to the pulley half 43 and any inward movement of the pulley half 44 by the shifting or adjusting operation is transmitted to the pulley half 42. In the remaining row the pulley parts are similarly mounted; the pulley parts 46 and 49 being slidable on the splined shaft 50, the pulley part 48 being slidable on the splined sleeve half 56 which abuts against the pulley part 49 and has a flange 57 acting on the pulley part 47, which in turn slides on the sleeve half 58 whose one end abuts against the pulley 46 and whose flange 59 acts on the pulley half 48. Therefore the correct relative axial positions of the various pulley parts is ensured for all radial positions of the belts or chains, and both belts or chains transmit the load at the same speed from the input shaft to the output shaft.

Figure 4:
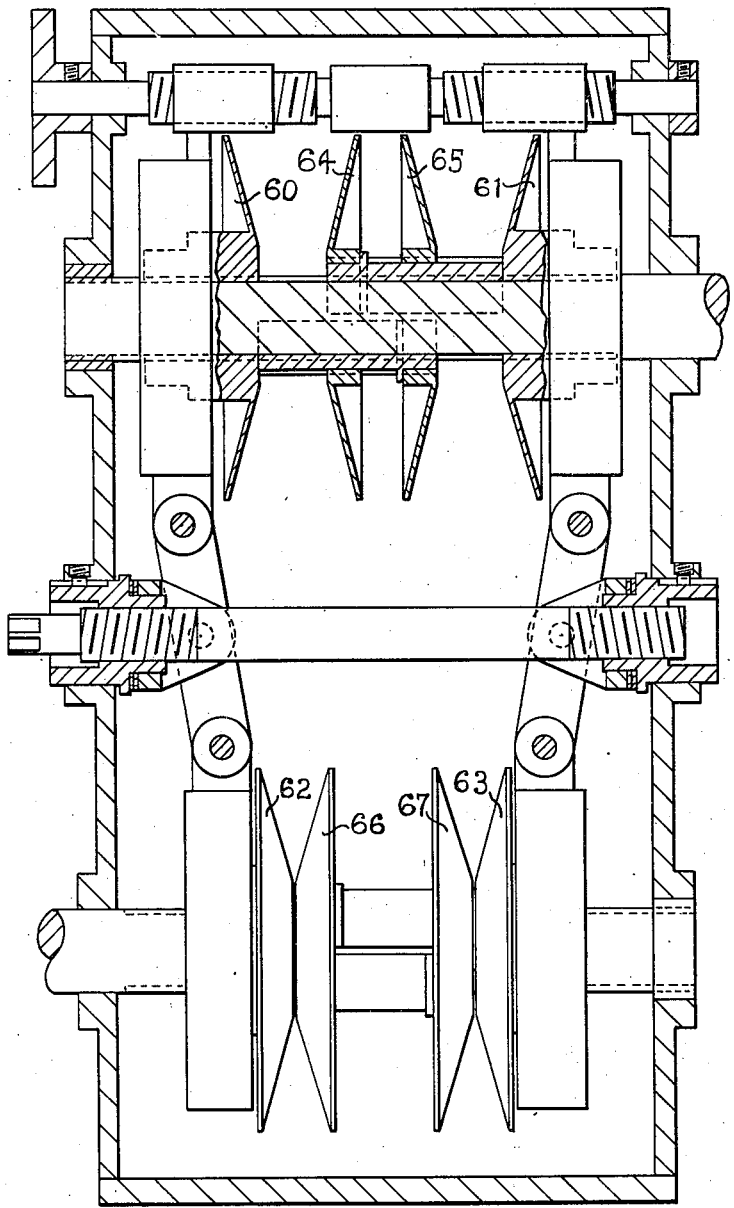
Figure 4 is a side view in section of an infinitely variable speed gear and illustrates a fourth construction.

Figure 4 shows the same arrangement of pulley parts, half sleeves and shafts to enable an increased load to be transmitted. In this construction the pulley parts 60, 61, 62 and 63 are shifted and adjustable in the manner hereinbefore described with reference to Figure 2 and the pulley parts 64, 65, 66 and 67 have movement transmitted to them by the pulleys 61, 60, 63 and 62 in the manner described with reference to Figure 3.

In order to enable a wider range of transmission ratios to be obtained in an infinitely variable speed gear of the hereinbefore specified kind and having a shifting and adjusting means in accordance with my invention, for example as shown in Figure 6, the output shaft 68 and input shaft 69 may be arranged in axial alignment with one part of the input shaft 69 extending into and journalled in a hollow in the output shaft 68 and with a carrier shaft 70 arranged parallel with the shafts 68 and 69 and carrying in a row the four parts 71, 72, 73 and 74 constituting two expanding V-pulleys adapted to slide on but rotate with the carrier shaft 70. The four parts 71, 72, 73 and 74 are slidable axially on the carrier shaft 70 but rotate therewith. The input shaft 69 has the two parts 75 and 76 constituting a third expanding V-pulley mounted to slide axially on it but rotate therewith. The output shaft 68 has the two parts 77 and and 78 constituting a fourth expanding V-pulley mounted to slide on it but rotate therewith.

The pulley parts 72 and 73 on the carrier shaft 70 are separate but have between them surfaces 84 and 85 respectively adapted to abut and act axially on each other. Between the pulley part 76 on the input shaft 69 and the pulley part 77 on the output shaft 68 there is a ball bearing 86 which assists in supporting the pulley part 77 but permits relative axial withdrawal movement between the pulleys parts 76 and 77. One endless belt or chain (not shown) is mounted on one of the pulleys on the carrier shaft 70 and on the pulley on the input shaft 69. Another endless belt or chain (not shown) is mounted on the other pulley on the carrier shaft 70 and on the pulley on the output shaft 68. The shifting and adjusting means are similar to those described with reference to Figure 2, the only difference being that the screw threads 87 and 88 on the shifting spindle 89 and the nuts 90 and 91 are all of the same hand.

In operation, the speed is varied by rotation of the shift spindle 79 which causes one part of each pulley to be displaced axially in the correct direction. The remaining parts of the pulleys are automatically displaced axially by the action of the belts or chains whilst moving towards or away from the pulley axes.

I claim:

1. An infinitely variable speed gear, comprising two-part expanding V-pulleys, a shifting screw, a nut provided on the shifting screw and directly connected to one part of one of the said expanding V-pulleys for shifting it, a lever pivotally connecting the said part to the corresponding part of another of the expanding V-pulleys, means which carry the lever and are displaceable and free to be displaced in one direction only, and means for adjusting and setting the lever relative to the first named part.

2. An infinitely variable speed gear, comprising two-part expanding V-pulleys, a shifting screw, a nut provided on the shifting screw, a thrust bearing provided on one part of one of the V-pulleys, a housing containing the said bearing and connected rigidly to the nut, a thrust bearing on the corresponding part of another of the V-pulleys, a housing containing the second named thrust bearing, a lever pivotally connecting the first named housing to the second named housing, a pivot on which the lever is fulcrumed, screw means for adjusting the position of the pivot relative to the nut, and means between the pivot and the screw means for enabling the pivot to change its position relative to the nut in one direction only.

3. An infinitely variable speed gear, comprising two pairs of expanding V-pulleys for duplicating transmission, a lever connecting two parts of one pair of V-pulleys together, a lever connecting two parts of the other pair of V-pulleys together, means for controlling axially each of the remaining parts of the two pairs of V-pulleys by a separate one of the first named four parts, pivots carrying the said levers, means for changing the location of the pivots at will, means for separately allowing the location of each of the pivots to change in one direction only, and means for adjusting two of the first named four parts at will.

4. An infinitely variable speed gear, comprising two-part expanding V-pulleys, a shifting screw having a right hand thread and a left hand thread, a nut provided on the right hand thread of the shifting screw and connected directly to one part of one of the V-pulleys, a nut provided on the left hand thread of the shifting screw and directly connected to the other part of the said V-pulley, levers connecting the two parts of the said V-pulley to the corresponding parts of another V-pulley, pivots which are separate from the said nuts and on which the said levers swing, means for changing the location of the pivots separately from the said nuts at will, and means for changing the location of each of the pivots separately from the said nuts in one direction only.

5. An infinitely variable speed gear, comprising two pairs of two-part expanding V-pulleys for obtaining a double speed transmission change, a shaft on which one V-pulley of the first pair and one V-pulley of the second pair are mounted, a shaft on which the other V-pulley of the first pair is mounted, a shaft on which the other V-pulley of the second pair is mounted, means for simultaneously shifting in the same direction, one part of the V-pulley on the second named shaft and one part of the V-pulley on the third named shaft, levers connecting separately the said parts to the corresponding parts of the V-pulleys on the first named shaft, pivots on which the levers are mounted, means for changing the location of the pivots simultaneously in opposite directions, and means for permitting location of the said pivots to change separately and in one direction only, the remaining two parts of the V-pulleys on the second and third named shafts being movable axially and interdependently on the said shafts and rotating separately with the said shafts, and the two V-pulleys on the first named shaft rotating with the said shaft and being axially slidable thereon and each having one of their parts interdependently movable axially in one direction with the other.

ALFRED BOOTH.

REFERENCES CITED

The following references are of record in the file of this patent:

UNITED STATES PATENTS

| Number | Name | Date |
|---|---|---|
| 2,109,247 | Clay | Feb. 22, 1938 |
| 2,112,157 | Hatcher | Mar. 22, 1938 |
| 2,183,267 | Rieser | Dec. 12, 1939 |
| 2,266,687 | Keller | Dec. 16, 1941 |
| 2,378,375 | Abbott | June 19, 1945 |

FOREIGN PATENTS

| Number | Country | Date |
|---|---|---|
| 72,542 | Switzerland | June 2, 1916 |